United States Patent [19]

Andoh et al.

[11] 4,044,349

[45] Aug. 23, 1977

[54] GAS DISCHARGE PANEL AND METHOD FOR DRIVING THE SAME

[75] Inventors: Shizuo Andoh; Norihiko Nakayama, both of Kobe, Japan

[73] Assignee: Fujitsu Limited, Kawasaki, Japan

[21] Appl. No.: 507,797

[22] Filed: Sept. 20, 1974

[30] Foreign Application Priority Data

Sept. 21, 1973 Japan ............................ 48-106730

[51] Int. Cl.[2] ............................ G06F 3/14

[52] U.S. Cl. ..................... 340/324 M; 315/169 TV; 340/343

[58] Field of Search ............ 340/324 M, 343, 173 PL; 315/169 TV

[56] References Cited

U.S. PATENT DOCUMENTS

| | | | |
|---|---|---|---|
| 3,803,586 | 4/1974 | Johanns et al. | 340/324 M |
| 3,875,472 | 4/1975 | Schermerhorn | 340/324 M |

*Primary Examiner*—Marshall M. Curtis
*Attorney, Agent, or Firm*—Staas & Halsey

[57] ABSTRACT

A gas discharge panel includes several pairs of column (X) electrodes arranged on a first substrate and several pairs of row (Y) electrodes arranged on a second substrate, the column and row electrodes being orthogonally oriented and in spaced, opposed relation to define therebetween a gap filled with an ionizable gas. In a first driving configuration, a corresponding electrode of each pair of (X) electrodes is selectively driven by an (X) address driver and similarly a corresponding one of each of the (Y) electrode pairs is selectively driven by a (Y) address driver. The other electrode of each of the (X) and (Y) electrode pairs then is connected in common to respective (X) and (Y) sustain voltage driver terminals. In a further embodiment, each of the (X) and (Y) electrode pairs is arranged in corresponding groups of electrode pairs, each group including a common number of such pairs. First electrodes of each pair of each group are connected to a common output terminal of an address and sustain voltage driver; thus, plural address and sustain voltage driver outputs corresponding to the plural groups are employed for each of the (X) and (Y) electrode pairs. The second electrodes of corresponding pairs of the plural groups are connected to respectively corresponding, further common output terminals of address and sustain voltage drivers; thus, a plurality of further common terminals corresponding to the number of electrode pairs in each group are provided, as to each of the (X) and (Y) electrodes. The panel as thus configured affords decoding of addressing signals applied to the common terminals by means of plasma coupling within the panel whereby the discharge point or cell defined by a desired electrode of each of the column and the row electrode pairs can be addressed selectively. A further embodiment provides shifting of the display to successive positions in either the (X) or (Y) directions.

6 Claims, 33 Drawing Figures

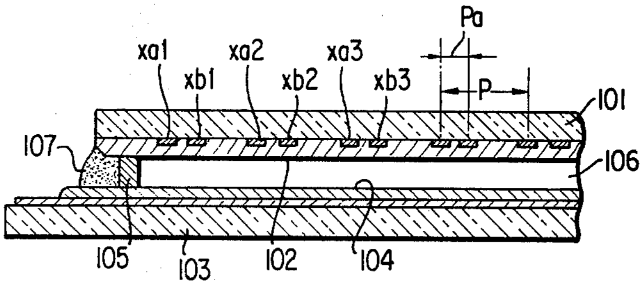
FIG. 2
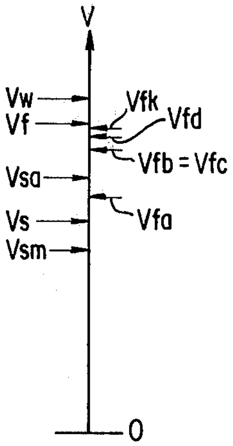
FIG. 3
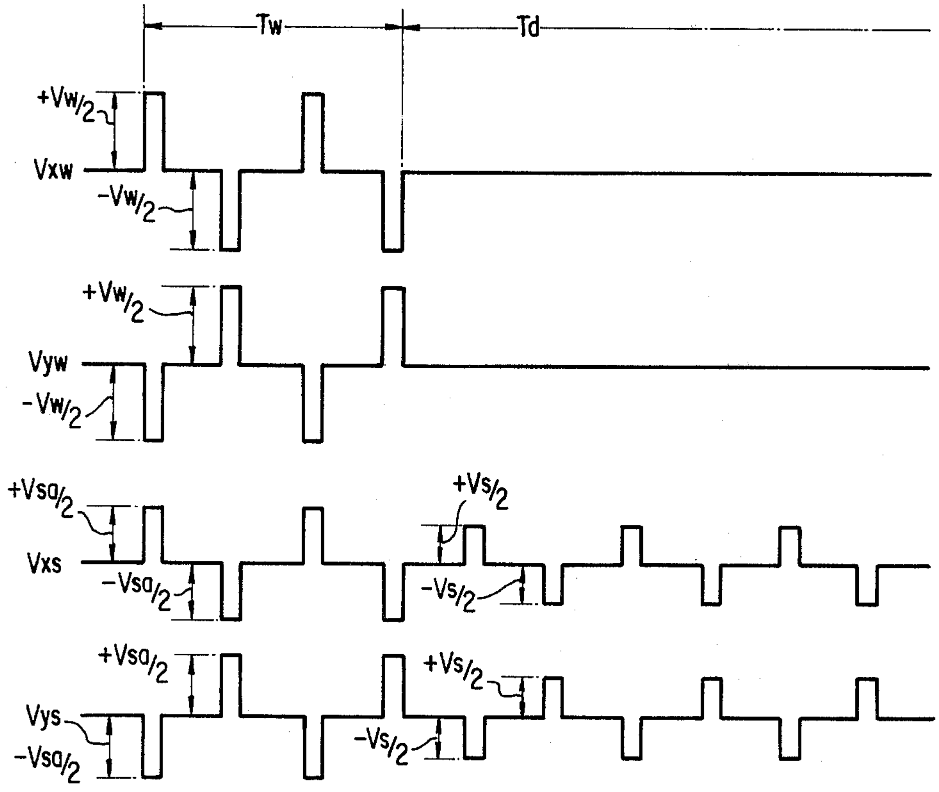
FIG. 4A
FIG. 4B
FIG. 4C
FIG. 4D

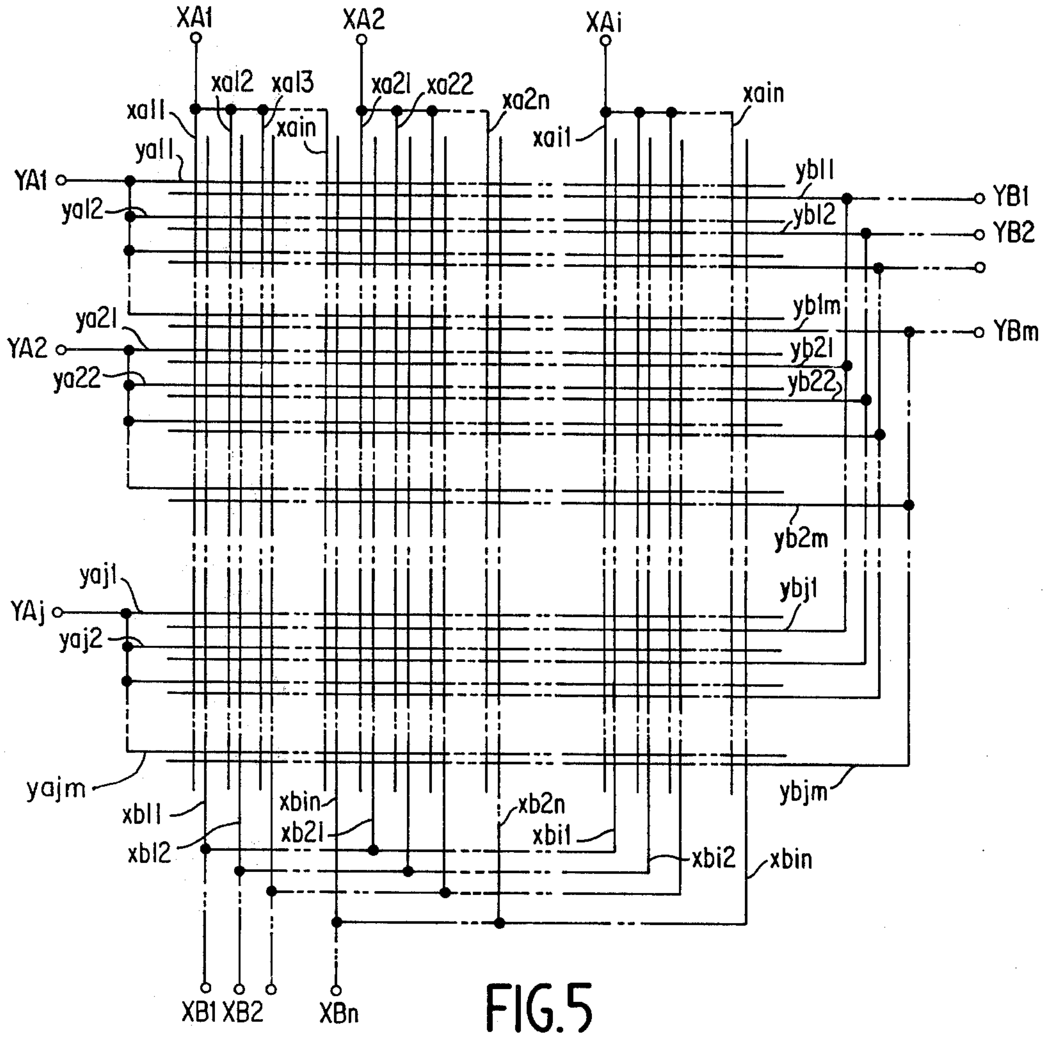
FIG.5
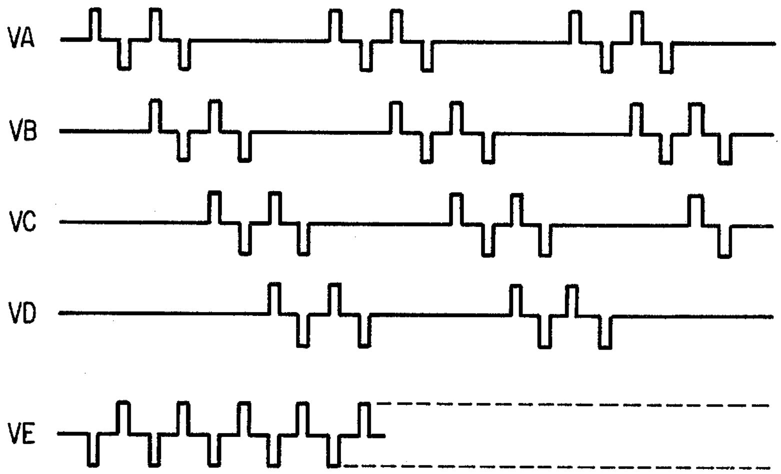
FIG.11A
FIG.11B
FIG.11C
FIG.11D
FIG.11E

FIG.8A
FIG.8B
FIG.8C
FIG.8D
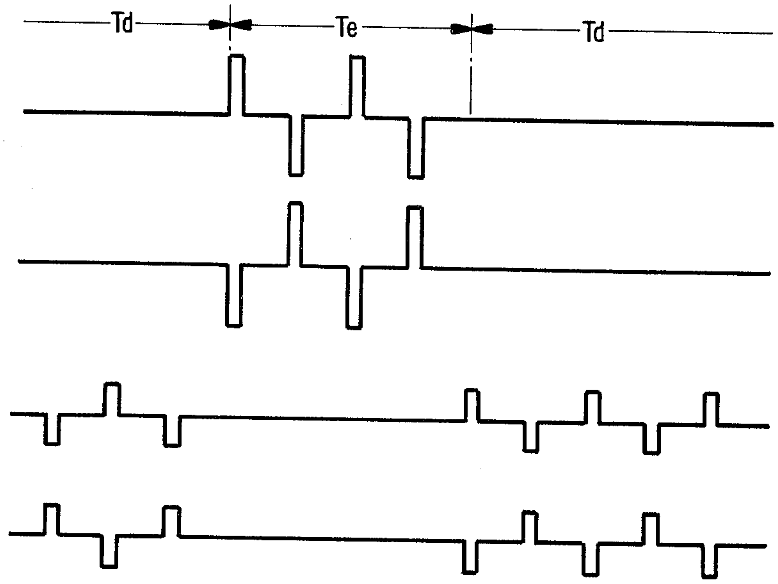
FIG.9A
FIG.9B
FIG.9C
FIG.9D
FIG.9E
FIG.9F
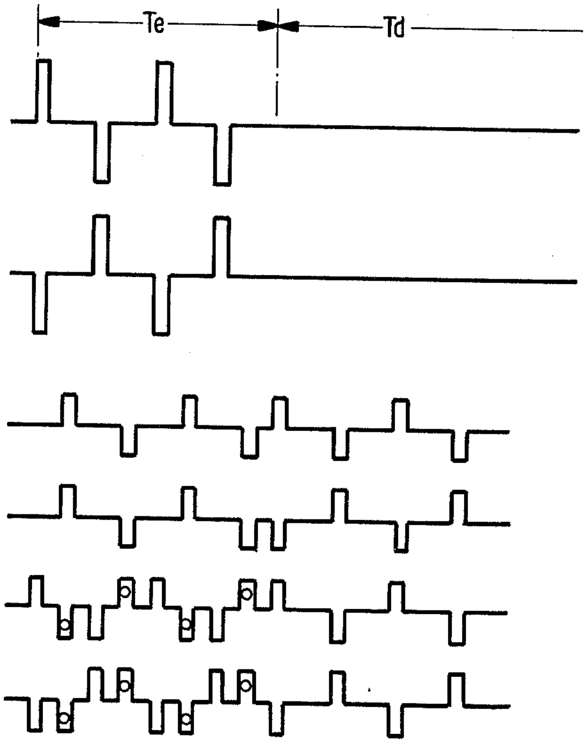

GAS DISCHARGE PANEL AND METHOD FOR DRIVING THE SAME

FIELD OF THE INVENTION

This invention relates to a gas discharge panel having a novel electrode structure and, more particularly, to a gas discharge panel driven by AC signals wherein at least two adjacent discharge points or cells correspond to one bit signal of information to be displayed or stored.

BACKGROUND OF THE INVENTION

Plasma display panels, or gas discharge panels, are well known in the art and, in general, comprise a structure including a pair of substrates respectively supporting thereon column (X) and row (Y) electrodes each coated with a dielectric layer such as a glass material having a low melting point and disposed in parallel spaced relation to define a gap therebetween in which an ionizable gas is sealed. Moreover, the substrates are arranged such that the electrodes are disposed in orthogonal relation to one another thereby defining points of intersections or cross points in turn defining discharge points or cells of the structure at which selective discharges may be established to provide a desired storage or display function. It is also known to operate such panels with AC voltages and particularly to provide a write voltage which exceeds the firing voltage at a given discharge point, as defined by a selected column and row electrode, thereby to produce a discharge spot at a selected cell. The discharge spot at the selected cell can be continuously sustained by applying an alternating sustain voltage. This technique relies upon the wall charges which are generated on the dielectric layers of the substrates which, in conjunction with the sustain voltage, operate to maintain discharges.

Details of the structure and operation of such gas discharge panels or plasma displays are set forth in U.S. Pat. No. 3,559,190 issued Jan. 26, 1971 to Donald L. Bitzer and U.S. Pat. No. 3,499,167 issued Mar. 3, 1970 to Theodore C. Baker et al.

Conventional gas discharge panels such are disclosed in the referenced patents require that a sustain voltage and a write voltage be applied to each discharge point through the same electrodes which define that discharge point. Suitable circuits for applying the appropriate voltages to those electrodes and accurately controlling the timing of the application of the write and sustain voltages are also required, imposing complicated circuit requirements and high cost for the driving and control circuitry of such devices. The degree of complication of the drive and control circuits increases with regard to the requirement of a decoding matrix circuit for selecting the electrodes to which the voltages are applied, particularly in the case of large display panels having increased numbers of electrodes.

The present inventors have heretofore proposed gas discharge panels and driving methods therefor which are directed to overcoming these disadvantages of prior art structures. For example, copending U.S. application Ser. No. 314,738, assigned to the common assignee of the present, discloses such an invention of the present inventors.

SUMMARY OF THE INVENTION

The present invention is directed to overcoming these objections and disadvantages of prior art systems and particularly has as an object the provision of a novel plasma structure and method of operation thereof which facilitates both writing and erasing operations and assures precise write-in and erasing of address selected positions in the panel.

A further object of the present invention is to provide a gas discharge panel and method of operation which employs plasma coupling within the panel to perform decoding operations whereby the need of an external decoding matrix is avoided.

Still another object of the present invention is to provide a gas discharge panel and method of operation which permits a significant decrease in the number of connecting terminals to the electrodes for connecting the latter to external circuits, such as driving circuits, thereby both simplifying the external circuit connections and facilitating random addressing functions.

A further object of the present invention is to provide an approved method of driving a gas discharge panel and of controlled discharging thereof thereby to facilitate the display and/or storage of information while permitting use of a simplified and low-cost driving circuit configuration as a result of utilizing plasma coupling functions within the gas discharge panel.

Still another object of the present invention is to provide an AC gas discharge panel having the function both of random addressing and of self shifting of the displayed information, which can be controlled with a simple and inexpensive circuit.

These and other objects of the invention will be apparent in the following detailed description. By way of summary of the present invention, the gas discharge panel includes pairs of column (X) electrodes arranged on a first substrate and pairs of row (Y) electrodes arranged on a second substrate wherein the column and row electrodes are disposed in orthogonal relationship and in spaced, parallel and opposed relation to define therebetween a gap filled with an ionizable gas sealed between the substrates. The spacing between the electrodes of each pair on a given substrate is made to be smaller than the spacing between the adjacent pairs of electrodes whereby for any given discharge point defined by one of the (X) and one of the (Y) electrodes, there results a difference in the distance from that given discharge point to the other three discharge points defined by the intersections of the two electrodes of the two pairs. Specifically, the (X) electrode pair and the (Y) electrode pair together define four such intersecting points, one of which is selected as a desired discharge point.

Because of this difference in distances, when a selected discharge point is addressed and a discharge produced thereat, the degree of plasma coupling from that discharge point to adjacent discharge points as defind by the adjacent electrodes varies as a function of distance whereby reduced firing voltage levels result at the discharge points closest to the selected discharge point. In fact, the decrease in the firing voltage resultant from the plasma coupling is an inverse function of the distance of the given discharge point from the selected discharge point.

The present invention teaches techniques and apparatus whereby display and storage can be obtained in a plasma display device, utilizing the plasma coupling phenomenon as relates to the electrode pair structure afforded in the device as described above, whereby display and storage at a desired discharge point can be achieved by shifting a discharge generated at an address discharge point, as defined by a specific electrode of each of a pair of column and a pair of row electrodes, to a different discharge point defined by those same electrodes of those same pairs.

In accordance with another feature of the present invention as disclosed in a further embodiment herein, the electrodes of the various pairs of column and row electrodes are arranged in groups. For each of the (X) and (Y) pairs of electrodes, there are provided plural first common terminals and plural second common terminals. A first electrode of each pair of a given group is connected to a respectively corresponding one of the first common terminals, for each of the groups of the (X) electrodes and for each of the groups of the (Y) electrodes. As to the other electrodes of the pairs, a corresponding electrode from each group is connected in common to a given one of the second common terminals. Hence, there are as many first common terminals as there are groups of electrodes and as many second common terminals as there are pairs of electrodes in each of the groups. By virtue of the this physical structure of the panel and the interconnection of the electrodes, and in reliance on the phenomenon of plasma coupling within the panel, random addressing of the intersection or cross points of the column and row electrodes may be achieved by selective application of energizing signals to the first and second common terminals. Moreover, a greatly reduced number of terminals for controlling the (X) and (Y) electrodes is achieved.

Other objects and features of the present invention will become clear from the following detailed description relating to the attached drawings.

BRIEF DESCRIPTION OF THE DRAWINGS

FIG. 2 shows a cross section of the major parts of the gas discharge panel incorporating the electrode arrangement shown in FIG. 1.

FIG. 3 is a voltage diagram plot for clarifying the relationship between the level of the operating voltage to be applied to each discharge point and the firing voltage characteristics appearing at each discharge point, in accordance with the degree of plasma coupling.

FIGS. 4A to 4D are waveforms of the operating voltages applied through the electrodes.

FIG. 5 shows the electrode arrangement of a second embodiment of the present invention.

FIGS. 8A to 8D and FIGS. 9A to 9F are voltage waveforms of the voltages applied to the electrodes in accordance with the panel constructions of FIGS. 5 and 6 to accomplish writing and erasing operations, respectively.

FIGS. 11A to 11E are waveforms of voltages supplied to the electrodes of the structure of FIG. 10 for performing the shifting of discharge spots displayed at the cross points or discharge cells of the panel of FIG. 10.

DETAILED DESCRIPTION OF THE DISCLOSURE

Figure 1:
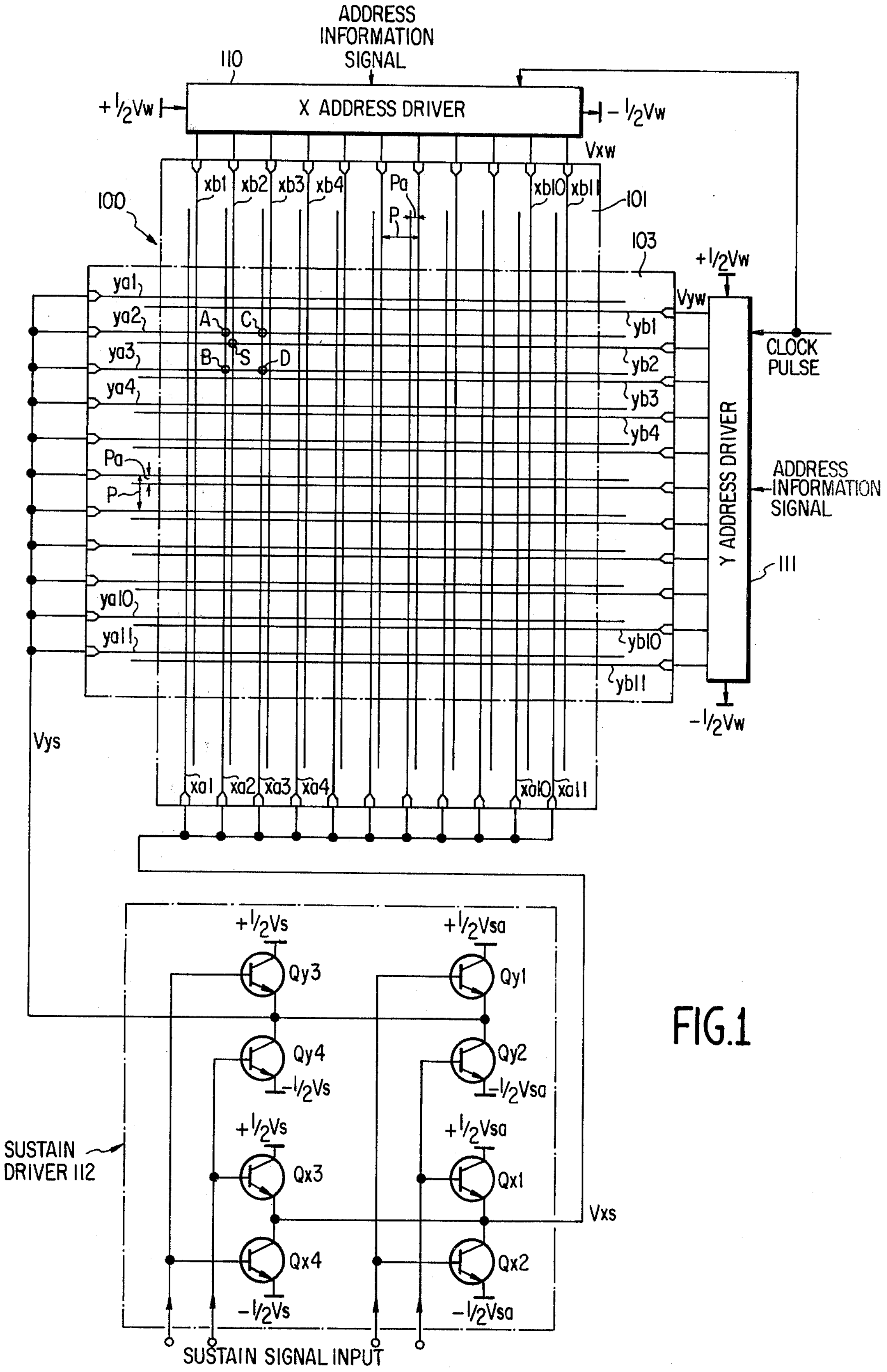
FIG. 1 shows the electrode arrangement of the gas discharge panel of the present invention and an embodiment of a driving circuit therefor, connected to the panel.

In FIG. 1, the electrode arrangement of the gas discharge panel conforming to the first embodiment of the present invention and the driving circuit connected therewith are shown in the form of a block diagram. A gas discharge panel 100 comprises plural column (X) electrodes, $xa_1$, $xb_1$, $xa_2$, $xb_2$, ... $xa_{11}$, $xb_{11}$ and also plural row (Y) electrodes, $ya_1$, $yb_1$, $ya_2$, $yb_2$ . . . $ya_{11}$, $yb_{11}$, arranged orthogonally to the column (X) electrodes.

As is obvious from FIG. 1, the X electrodes are arranged in pairs; specifically, each successive two adjacent X electrodes, that is, the electrodes $xa_i$ and $xb_i$ ($i$ = 1,2 . . . , 11) form an electrode pair by providing alternately wider and narrower spaces between successive X electrodes. Similarly, the row (Y) electrodes are arranged so that each successive two adjacent Y electrodes, that is, the electrodes $ya_i$ and $yb_i$ ($j$ = 1,2,. . ., 11) form a pair or electrode by providing alternately wider and narrower spaces between successive Y electrodes. According to the characteristics of the present invention, the space P$a$ between the electrodes of each pair of X and Y electrodes, namely, between the electrodes $xa_i$ and $xb_i$, and between the electrodes $ya_j$ and $yb_j$ is selected to be narrower than one half of the space P between corresponding electrodes of successive pairs ($P_a/P < \frac{1}{2}$).

FIG. 2 is a cross-sectional view of a portion of the structure of a gas discharge panel incorporating an electrode arrangement as described in relation to FIG. 1. The X electrodes, for example, may be formed by a printing method and supported on the internal surface of a first glass substrate 101, and are spaced to form electrode pairs, designated as in FIG. 1. The X electrodes are covered with a dielectric layer 102 consisting of a glass material of low melting point, or a metal oxide having an insulating property. The Y electrodes may be formed and supported in an identical manner on the internal surface of a second glass substrate 103, again arranged in pairs and covered with a dielectric layer 104 as in the case of the X electrode.

The first and second substrates, 101 and 103, are positioned in face-to-face, or opposed, parallel spaced relationship, so that the said X and Y electrodes are positioned orthogonally, with the proper gap 106 determined by the spacer 105. The substrates 101 and 103 are sealed along their peripheral edges with a sealing material 107. The gap 106 is filled with an ionizable gas, for example, with a gas mixture of N$e$ and A$r$, by any well known method.

Referring again to FIG. 1, the operation of the gas discharge panel 100 is now explained. Initially, let it be assumed that each intersection or cross point between an X electrode and a Y electrode has the characteristic of a firing voltage $V_f$. Further, let it be assumed that it is desired to establish a discharge at the discharge point S defined in turn by the X electrode $xb_2$ and the Y electrode $yb_2$. For purposes above noted and later to be explained in detail, it will be seen that the electrode $xb_2$ is one of a pair of X electrodes, the other of which is electrode $xa_2$. Similarly, electrode $yb_2$ is one of a pair, the other being $ya_2$. Accordingly, X address driver 110 and Y address driver 111 in response to the appropriate input address information are caused to establish a write-in voltage $V_w$ between the X electrode $xb_2$ and the Y electrode $yb_2$, which voltage $V_w$ is higher than the firing voltage $V_f$. As a result, a discharge spot appears at the selected discharge point S as indicated by the shading in the area S in FIG. 1.

The discharge phenomenon generates electrons, ions, and metastable atoms which then diffuse to the adjacent, peripheral discharge points surrounding the discharge point S. This diffusion results in decreasing the level of the firing voltage at the noted peripheral discharge points. The decrease of the firing voltage at these peripheral discharge points resulting from the noted diffusion, this action also being known as the degree of plasma coupling, is in inverse proportion to the distance of the peripheral discharge points relative to the selected discharge point S.

As mentioned previously, in the case of the gas discharge panel of the present invention, X and Y electrodes are formed in pairs and the interval P between successive pairs of electrodes is made wider than two times the space $P_a$ between the electrodes of each pair. Therefore, the relationship between firing voltages $Vf_a$, $Vf_b$, $Vf_c$ and $Vf_d$ at the four discharge points A, B, C and D around the selected discharge point S can be expressed as follows.

$$Vf > Vf_d > Vf_c \simeq Vf_b > Vf_a \quad (1)$$

In general, the reduced firing voltage $Vf_k$ for discharge points beyond A, B, C, or D, as defined by other electrodes $xa_i$ and $ya_j$ can be related as:

$$V_f \geq Vf_k > Vf_d \quad (2)$$

Therefore, after the write-in voltage $Vw$ is impressed to the electrodes $xb_2$ and $yb_2$ or when the voltage $Vs_a$ which is selected so as to satisfy the relation in equation (3), $$Vf_b > Vs_a > Vf_a \quad (3)$$

is applied simultaneously to the selected discharge point S, as well as all other discharge points, defined by the electrodes $xa_i$ and $ya_i$ of each pair of electrodes to which $Vs_a$ is applied, discharge occurs only at the discharge point or cell A, nearest to the selected discharge point or cell S, but not at the discharge points B, C, D, or other discharge point or cells, even though the same voltage $Vs_a$ is applied thereto.

In order to perform such operations as mentioned above, the electrodes $xb_i$ and $yb_j$ of each pair of the X and Y electrodes are respectively connected to the X address driver 110 and Y address driver 111, as shown in FIG. 1 and the other electrodes $xa_i$ and $ya_j$ of each pair of X and Y electrodes, respectively, are connected in common to the sustain driver 112.

The sustain driver 112 includes a pair of switching transistors $Qx_1$ and $Qx_2$ which alternately apply pulse voltages of $+\frac{1}{2}Vsa$ and $-\frac{1}{2}Vsa$ to the electrodes $xa_i$, and a pair of switching transistors $Qy_1$ and $Qy_2$ which alternately supply pulse voltages of $+\frac{1}{2}Vsa$ and $-\frac{1}{2}Vsa$ to the Y electrodes $ya_j$, in the reverse polarity relative to the X electrodes. If the transistors $Qx_1$ and $Qy_2$, and $Qx_2$ and $Qy_1$ of the sustain driver are turned ON alternately and with the same timing during operation, a pulse voltage of $Vsa$ having both positive and negative polarities is applied to each cross, or discharge, point of the electrodes $xa_i$ and $ya_j$. Under this state, the discharge spot can be generated selectively at the cross point or discharge cell defined by electrodes $xa_i$ and $ya_j$, respectively, forming pairs with the selected electrodes $xb_i$ and $yb_j$; it can also be established by applying a write-in pulse voltage having the amplitude of $\frac{1}{2}Vw$, and both positive and negative polarities of $\frac{1}{2}Vsa$ from the address drivers 110 and 111, respectively, to the electrodes $xb_i$ and $yb_j$ applied thereto, the latter being selected based on the address information signals.

In an alternative operation, the level of voltage applied in common to the electrodes $xa_i$ and $ya_j$ is set at the level of the $Vsa$ only during the writing period in which the electrodes $xb_i$ and $yb_j$ are selected and the write-in voltage $Vw$ is impressed; during other periods, an ordinary sustain voltage $Vs$ is applied. In order to realize such an operation, the sustain driver 112, in the circuit configuration in FIG. 1, further includes a pair of switching transistors $Qx_3$ and $Qx_4$ which supply pulse voltages of $+\frac{1}{2}Vs$ and $-\frac{1}{2}Vs$ alternately to the X electrode $xa_i$ and a pair of switching transistors $Qy_3$ and $Qy_4$ which supply pulse voltages of $+\frac{1}{2}Vs$ and $-\frac{1}{2}Vs$ with the inverse polarity to the Y electrode $ya_i$.

FIG. 3 shows the voltage characteristics for each discharge point or cell, and the operating voltage to be applied through the electrodes, as plotted on the voltage axis V. From this figure the relation of voltages given by the equations (1) to (3 ) above and selection of the operating voltage will be made clearer. FIGS. 4A and 4B, respectively, show the waveforms of write-in voltages $Vxw$ and $Vyw$ mentioned above which are selectively applied to the X and Y electrodes $xb_i$ and $xb_j$, respectively, of each electrode pair. FIG. 4C and FIG. 4D, respectively, show the waveforms of the sustain voltages $Vxs$ and $Vys$ which are applied in common to the other X and Y electrodes $xa_i$ and $ya_j$ of each electrode pair. From the voltages waveforms shown in FIGS. 4C and 4D, it is obvious that positive and negative pulse voltages set at level of $Vsa$, i,e. $\pm VSa/2$, are impressed in common only during the write-in period of $Tw$, and thereafter the holding voltage set at level of $Vs$, i.e. $\pm Vs/2$, is applied in common during the display period of $Td$.

An explanation is now made of a second embodiment of the gas discharge panel of the present invention. FIG. 5 shows an electrode arrangement of a gas discharge panel wherein a decoding function is incorporated in the panel by making use of the plasma coupling between the discharge points as explained in the previous embodiment. Particular features of this embodiment shown in FIG. 5 can be seen in the mutual connections of the X and Y electrodes, each again arranged in the form of electrode pairs, and further connected in groups. Namely, the X electrodes are arranged in *i.n* groups of electrode pairs, each pair consisting of first and second electrodes, $xa_{in}$ and $xb_{in}$ (*i, n:* integer). First common terminals XA1 to XA*i* are provided for one electrode, $xa_{in}$, of each electrode pair of corresponding ones of the *i* groups. Thus there are formed *i* electrode groups, each of *n* pairs of electrodes, and each group *i* has a common terminal XA*i*, respectively, to which a first electrode $xa_{in}$ of each pair of that group is connected in common. Second common terminals XB1 to XB*n* are provided to which second electrodes $xb_{in}$ of respectively corresponding ones of the *n* pairs of each electrode group are connected in common. Similarly, the arrangement of (Y) electrodes includes *j* groups of *m* electrode pairs, each pair consisting of first and second electrodes $ya_{jm}$ and $yb_{jm}$ (*j, m:* integer), third common terminals YA1 to YA*j* and fourth common terminals YB1 to YB*j*. A first electrode $ya_{jm}$ of each of the *m* electrode pairs of a given group *j* is connected to a corresponding, common terminal YA*j* and the second electrodes $yb_{jm}$ of corresponding pairs *m* of the *j* groups are connected in common to the respective, fourth common terminals YB*m*. According to the present invention, mutual connections between electrodes for each common terminal, No. 1, No. 2, No. 3 and No. 4 may be done at each section of the panel using a lead wire; alternately, it may be done simulaneously with the formation of each electrode on the panel substrate. In any case, for the electrodes of *i.n* pairs *xj. m* pairs, as shown, the number of terminals to be connected to the driving circuit is $n + n$ for the X electrode side and $j + m$ for the Y electron side.

Figure 6:
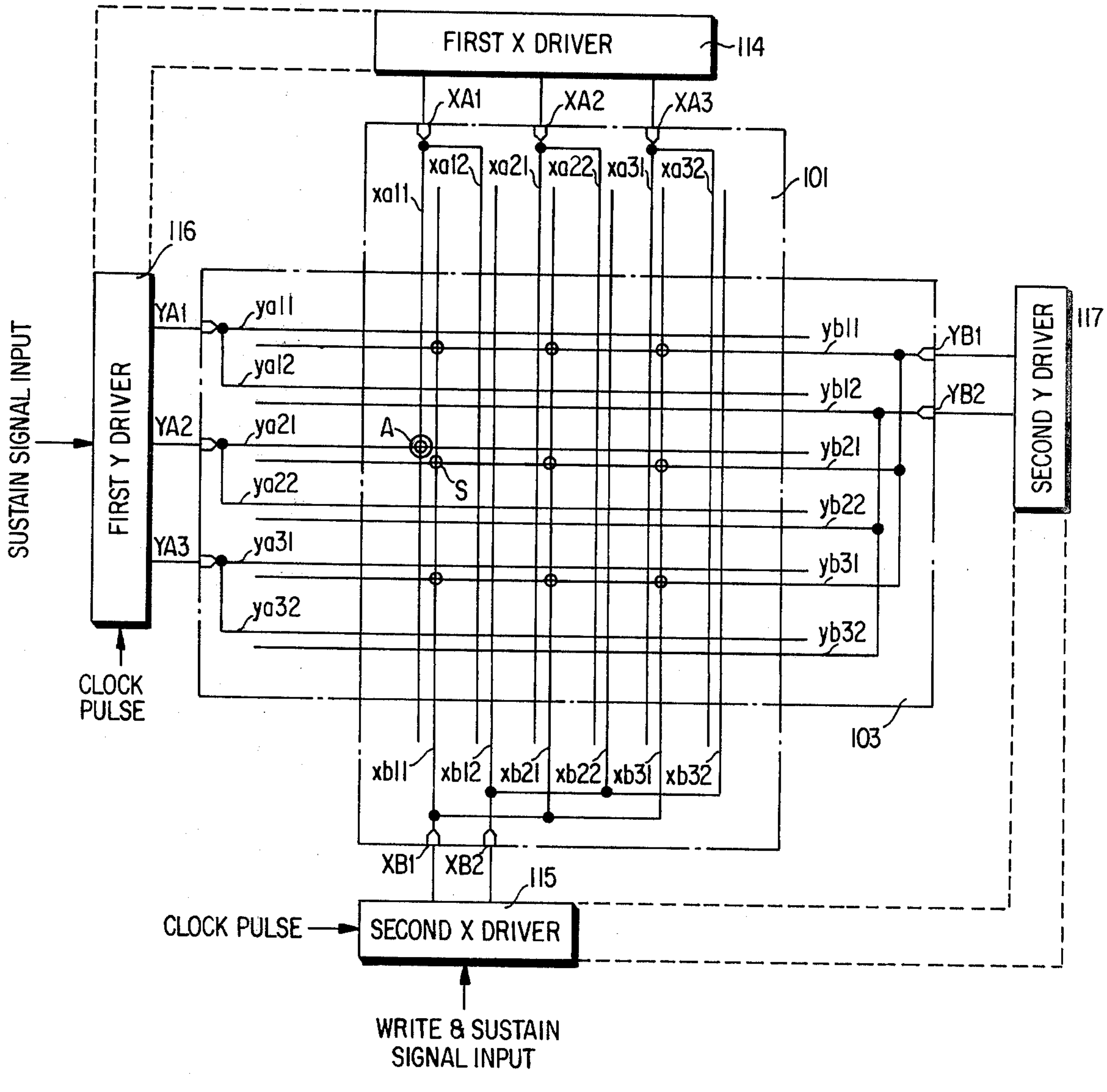
FIG. 6 shows an electrode arrangement of a reduced number of electrodes but organized in accordance with the second embodiment of the invention as shown in FIG. 5 for facilitating an explanation of the operation of the discharge panel so constructed.

FIG. 6 illustrates a gas discharge panel having an electrode arrangement of 6 pairs × 6 pairs, and the driving circuit of each electrode. In this case, the connections for the common terminal of each electrode can be established respectively at the surface of the substrates 101 and 103 by the same method as employed in the formation of the electrodes, for example, by the printing method. The operation of the embodiment shown in FIG. 6 will be explained hereunder in connection with the voltage waveforms in FIGS. 7A to 7H.

Figure 7A:
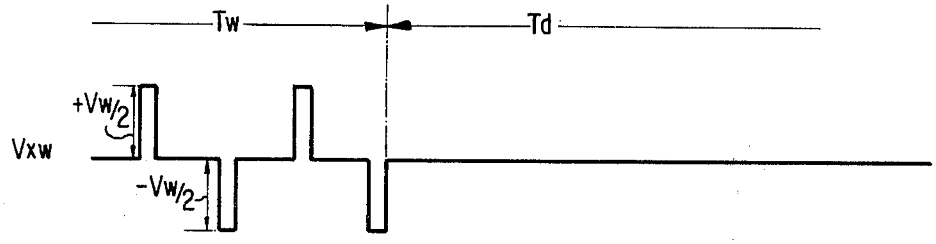
FIGS. 7A to 7H show waveforms of voltages applied to the common terminals through which the electrodes configured as shown in FIGS. 5 and 6 are connected, for driving the corresponding gas discharge panels.
Figure 7B:
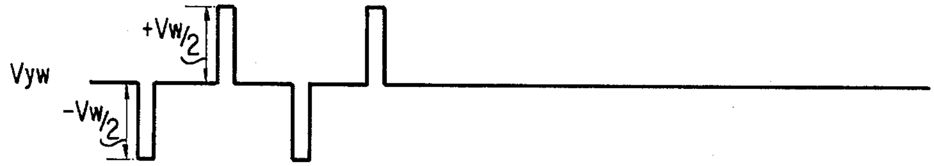
Figure 7C:
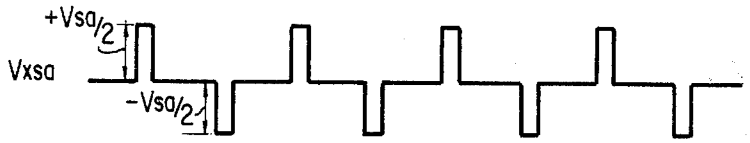
Figure 7D:
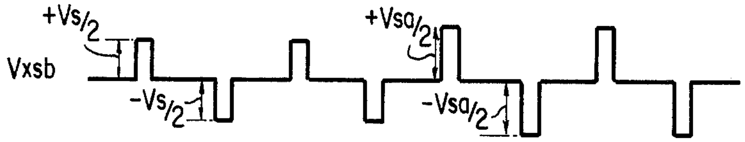
Figure 7E:
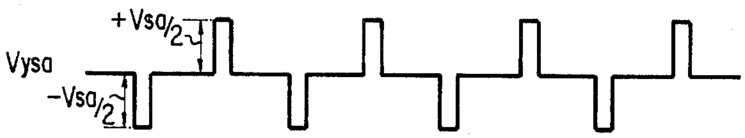
Figure 7F:
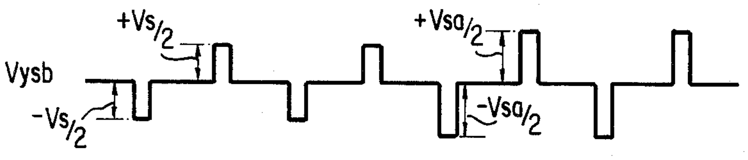

For instance, in case of writing in the formation by selecting the discharge point or the cell A between the X electrode $xa_{11}$ and Y electrode $ya_{21}$, the positive and negative pulse voltages V*xw* and V*yw* having the amplitude of ½.V*w*, respectively, as shown in FIG. 7A and FIG. 7B are selectively supplied to the common terminals XB1 and YB1 from the second driver 115 for the X electrode and the second driver 117 for the Y electrode. As a result of this, a discharge spot appears at nine cells, as marked with circles defined by the cross points of one electrode of each of the X and Y electrode pairs associated with the selected terminals XB1 and YB1. At this time, the positive and negative pulse voltages V*xsa* and V*ysa* having the amplitude of ½ *Vsa* with inverse polarity as shown in FIGS. 7C and 7E are simultaneously supplied to the selected common terminals XA1 and YA2 by the first X driver 114 and first Y driver 116, respectively. In addition, for the not selected common terminals XA2, XA3, and YA1, YA3 among the first and second common terminals, the positive and negative pulse voltages V*xsb* and V*ysb* having the amplitude of ½ V*s* with inverse polarity as shown in FIGS. 7D and F are supplied respectively from the first X driver 114 and first Y driver 116.

Through the operations of the voltages applied as stated above, the voltage V*sa* is supplied only to the cell defined by the cross point of the electrodes $xa_{11}$ and $ya_{21}$, of he adjacent nine cells which discharge wih the write-in voltage V*w* and accordingly have their firing voltages lowered to the level of V*fa*. Thus, only one cell A discharges as shown by the double circles. In the case of the other cells, discharging does not occur since the applied voltage is lower than the V*fa*. In the present invention, since the information signal having been applied to the common terminal by such operations is decoded, only a simplified and low cost circuit is required for driving the discharge panel.

In FIG. 7, during the display period of T*d* after the write-in period shown by T*w*, the pulse voltages having the amplitude of ½ V*sa* and positive/negative polarities are supplied to the terminals XA1 to XA3 and XA1 to YA3 succeeding the one electrode of each electrode pair, as shown in FIGS. 7C and 7E, and the written discharge spots can be sustained.

Figure 7G:
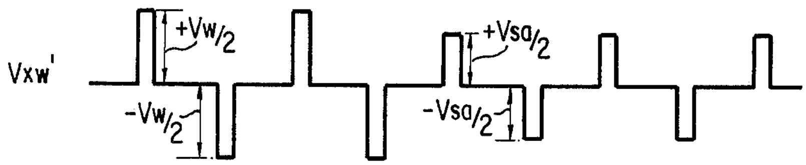
Figure 7H:
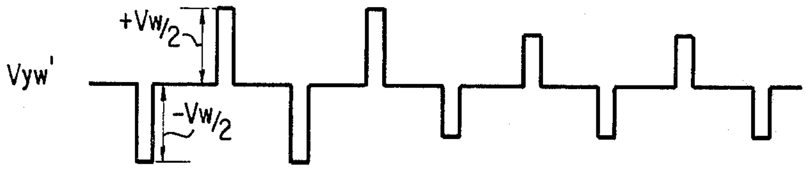

In another method, the level of voltage applied to the selected terminals is increased up to the level of the ½ V*sa* only during the write-in period, by always applying the positive and negative sustain pulses, each having an amplitude of ½ V*s*, to the common terminals XA1 to XA3 and YA1 to YA3. Moreover, by applying the sustain voltages V*xw'* and V*yw'* which are lower than the firing voltage to all the second and fourth common terminals including the common terminals XB1 and YB1 selected previously in order to feed the write-in voltage during the display period T*d* as shown in FIGS. 7G and 7H, a bit of information can be displayed at the four display points comprising the cross points of the two electrodes forming an electrode pair. When assuring such operations as mentioned above in the present invention, terminals in both the A and B groups can naturally be used vice versa.

For erasing the discharge spot displayed on the gas discharge panel, it is possible to employ any of three modes, simultaneously erasing for the entire panel, block erasing and one point erasing, according to the present invention. In the case of the simultaneous erasing for the entire panel, the write-in voltage is applied to all the second and fourth common terminals XB1, XB2 and YB1, YB2, and simultaneously the sustain voltage for the first and third common terminals XA1 to XA3 and YA1 to YA3 is interrupted. In other words, when positive and negative pulse voltages, each of the amplitude of ½ V*w* as shown in FIGS. 8A and 8B, are applied to the common terminals XB1, XB2, YB1 and YB2 during the erasing period T*e* thereby to cause discharging at all the cross points of the electrodes and, in addition, the sustain voltage, normally applied to the common terminals XA1 to XA3 and YA1 to YA 3 to sustain discharges at selected points or cells for display, is interrupted as shown in FIGS. 8C and 8D, discharging does not occur when the sustaining voltage is impressed again because the wall charges of the display cells disappear due to the discharging at the write-in cells.

Block erasing can be realized by applying the erase pulse to the common terminals selected from both the first and third common terminals XA1 to XA3 and YA1 to YA3, following the discharges established for the display. For example, when the erase pulse is applied after selecting the common terminals XA1 and YA2, erasing in the block of cross points of the electrodes associated with these terminals can be done; thus, erasing for every character may conveniently be done where the display is arranged such that one block corresponds to one character.

For the single point erasing mode, the wall charge of the display cell to be erased is dropped to the write-in cell in the neighborhood of the wall charge. For instance, for erasing selectively the discharge spot displayed by the cell A in FIG. 6, discharging must occur at nine cells marked with circles as in the case of the write-in mode when the write-in voltage V*w* as shown in FIGS. 9A and 9B is fed across the common terminals XB1 during the erasing period T*e*. Simultaneously, when the sustaining voltages to be applied respectively to the terminals XA1 and YA2 are in phase, as shown in FIGS. 9C and 9D, no voltage is applied to the cell A; thus, the wall charge of cell A disappears by the discharging of the cell S adjacent to the cell A. During this time, the pulse voltages marked with small circle S in FIGS. 9E and 9F are applied to the common terminals XA2, XA3 and YA1, YA3 — i.e., the terminals other than those selected for the erasing, for the purpose of preventing non-selected cells from being erased.

As another erasing method, one may interrupt completely the sustain voltage at the common terminals XA1 and YA2 corresponding to the electrodes *xa*11 and *ya*21 defining the cell A to be erased, during the erasing period, and simultaneously apply the write-in voltage V*w* across the electrode terminals XB1 and YB1 defining the cell S.

Figure 10:
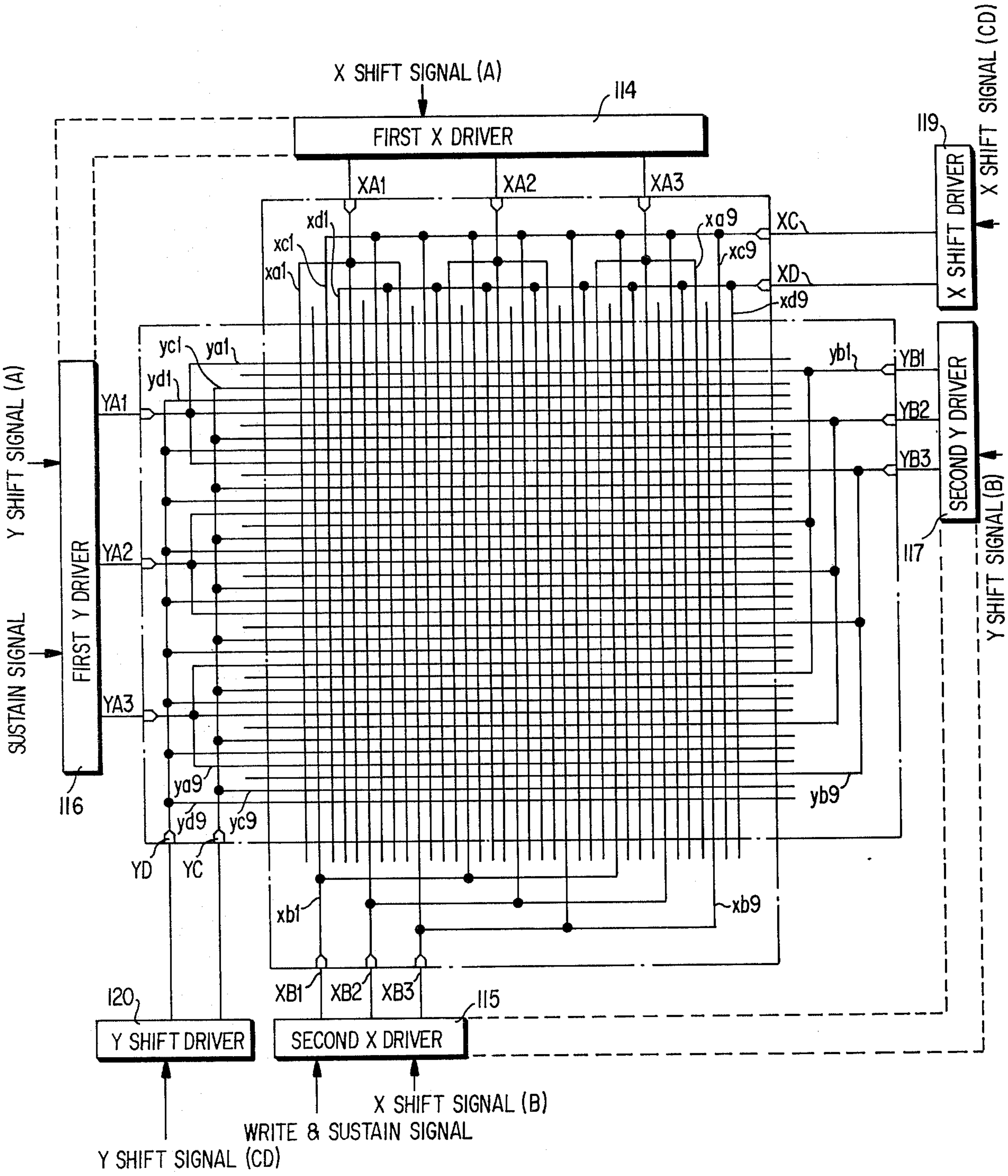
FIG. 10 shows a gas discharge panel in accordance with a further embodiment of the invention which incorporates the features of FIGS. 5 and 6 and further provides for self-shift functions.

With reference to FIG. 10, a gas discharge panel providing a self-shift function for the discharge spot, based on plasma coupling, is shown as a third embodiment of the present invention. In FIG. 10, the X and Y electrodes further include the electrodes *xcl, xdk* and *ycl, ydk* (*l, k:* integer) arranged between each adjacent pair of X and Y electrodes. The electrodes *xc*1 to *xc*9 placed between each pair of electrodes on the X electrode side are connected in common to the common terminal XC and the electrodes *xd*1 to *xd*9 are connected in common to the common terminal XD. Similarly, the electrodes *yc*1 to *yc*9 and *yd*1 to *yd*9 arranged between each pair of electrodes on the Y electrode side are respectively connected in common to the common terminals YC and YD. An X shift driver 119 is provided for the common terminals XCand XD, and a Y shift driver 120 is provided for the common terminals YC and YD.

In operation, recall the explanation regarding FIG. 6 that the cross point of each electrode pair can be addressed randomly by selectively driving the first, second, third and fourth drivers 114 to 117. During such write-in and display operations, the electrode provided between each electrode pair can be used so as to control the plasma coupling between each electrode pair, by being set at a predetermined potential. A feature of this embodiment is that the pulse voltages shown in FIGS. 11A to 11E are supplied from each driver to each common terminal when shifting the pattern of the written display information, as mentioned above. Namely, when shifting the information pattern displayed on the panel in the right direction (i.e., parallel to the Y electrode direction) of the drawing, the pulse voltages VA, VB, VC, and VD are applied in successive, phase shifted relation to the common terminals XA (1 to 3), XB (1 to 3), XC and XD as shown in FIGS. 11A, 11B, 11C and 11D. During this period, moreover, the pulse voltage VY shown in FIG. 11E has to be fed to each common terminal succeeding the Y electrode. Thereby, each discharge spot can be shifted in the Y direction in the form of the initial display pattern. This shifting operation is based on the plasma coupling between cells defined by the cross points of each X and Y electrode. The shift voltage in FIG. 11 can be obtained by controlling the driving timing of the first and second X drivers 114 and 115, and the X shift driver 119.

On the other hand, as is easily understood from the above explanation, if the shift voltages VA, VB, VC and VD are applied in succession to the command terminals YA (1 to 3), YC and YD from the first and second Y drivers 116 and 117, and the Y shift driver 120, in contrast with the X electrode and Y electrode sides, the displayed information pattern can also be shifted in the X electrode direction. Thus, according to the third embodiment, a unique gas discharge panel having both random address and self-shift functions, but employing a reduced number of terminals, is realized. In this case, it is sufficient to provide only one electrode between each electrode pair, and the shift operation can be achieved by using a 3-phase shift voltage.

Numerous modifications and adaptations of the system of the invention will be apparent to those skilled in the art and thus it is intended by the appended claims to cover all such modifications and adaptations which fall within the true spirit and scope of the invention.

What is claimed is:

1. A method of driving a gas discharge panel having first and second substrates disposed in spaced, parallel relationship and sealed to confine an ionizable gas therebetween, first and second sets of plural electrode pairs supported on said first and second substrates, respectively, and disposed in orthogonal relationship to establish four points of intersection between each electrode pair of said first set and each electrode pair of said second set defining respectively corresponding discharge points with addresses determined by the electrodes associated with the said points of intersection, a discharge at a given first one of said four intersection points defined by a first electrode in a given pair in each of said sets as a write-in point requiring that a voltage of a predetermined first level in excess of a firing voltage be applied to the first electrodes of said first and second sets intersecting at that point, the discharge at a given second one of said four intersection points defined by a second electrode in said given pair in each of said sets as a display point requiring that a voltage of a level less than said firing voltage be applied to the second electrodes of said first and second sets intersecting at that given display point when a discharge is produced at its corresponding given write-in point, said method comprising the steps of:

identifying a pair of electrodes of each of said first and second sets corresponding to the address of points of intersection at which a discharge is to be established;

applying a write voltage having a value greater than said firing voltage to a first electrode of the identified pair of each of said first and second sets corresponding to the addressed write-in point to establish a discharge at the write-in point of the said first electrodes of said identified pairs of said first and second sets, and selectively applying an energizing voltage having a value less than said firing voltage to second electrodes of said identified pairs of said first and second sets thereby to establish a discharge at the display point of said second electrodes of said identified pairs of said first and second sets in accordance with the discharge established at the write-in point of said first electrodes of the respectively corresponding, identified pairs of said first and second sets.

2. A method of driving a gas discharge panel comprising first and second substrates disposed in spaced, parallel relationship and sealed to confine an ionizable gas therebetween, first and second sets of plural electrode pairs supported on said first and second substrates, respectively and disposed in orthogonal relationship to establish four adjacent points of intersection between each electrode pair of said first set and each electrode pair of said second set defining respectively corresponding discharge points, a discharge at a given first one of said four intersection points defined by a first electrode in a given pair in each of said sets as a write-in discharge point requiring that a voltage of a predetermined first level in excess of a normal firing voltage be applied to the first electrodes of said first and second sets intersecting at that given write-in point, a discharge at a given write-in point reduces the firing voltage at a corresponding adjacent display discharge point defined by the second electrodes of the corresponding pairs to a level less than the normal firing voltage level, a discharge at said correspondingly display discharge point requiring that a voltage of a level less than said normal firing voltage and greater than said reduced firing voltage level be applied to the second electrodes of said first and second sets wherein each of said first and second sets of electrodes is arranged in plural groups, each group including plural pairs of electrodes, a first plurality of means respectively corresponding to said plural electrode pairs in each of said groups for commonly connecting the first electrode of the corresponding electrode pair in each of said groups, a second plurality of means respectively corresponding to said plural groups for commonly connecting the second electrodes of the pairs of electrodes in the corresponding group, said method comprising the steps of:

applying a write voltage to a selected one of said first plurality of connecting means for each of said first and second sets, said write voltage establishing discharges at the write-in points formed by the first electrodes of the pairs of electrodes of said groups corresponding to the selected one of said first plurality of connecting means of each said set, applying a reduced firing voltage to a selected one of said second plurality of connecting means for each of said first and second sets, the reduced firing voltage being of a level to establish a discharge at the display point of said second electrodes of the identified pairs in accordance with the established discharge at an adjacent write-in point and subsequently applying sustain voltages to said plurality of second connecting means to produce sustained discharges at display points of said panel which correspond to a previously addressed write-in point and have been discharged by the application of a reduced firing voltage 3. An addressable gas discharge panel and driving system therefor, comprising:

first and second substrates disposed in spaced, parallel relationship and sealed to confine an ionizable gas therebetween, first and second sets of plural electrode pairs supported on said first and second substrates, respectively, and disposed in orthogonal relationship to establish four points of intersection between each electrode pair of said first set and each electrode pair of said second set defining respectively corresponding discharge points, a discharge at a given first one of said four intersection points defined by a first electrode in a given pair in each of said sets as a write-in point requiring that a voltage of a predetermined first level in excess of a normal firing voltage be applied to the first electrodes of said first and second sets intersecting at the given write-in point, a discharge at a given second one of said four intersection points defined by a second electrode in said given pair in each of said sets as a display point requiring that a voltage of a level less than said normal firing voltage be applied to the second electrodes of said first and second sets intersecting at that given display point when a discharge is produced at its corresponding given write-in point, first and means connected to the first electrodes of each of said sets for applying a write voltage of said predetermined first level to selected ones of said first electrodes to establish an addressed discharge at the corresponding write-in point, and second means connected to the second electrodes of said pairs of each of said sets for selectively applying a sustain voltage or an energizing voltage in excess of the level of the sustain voltage and less than said normal firing voltage in common to the second electrodes of said pairs of each of said sets to establish a selected display discharge at a display point corresponding to an addressed write-in point.

4. An addressable gas discharge panel and driving system therefor, comprising:

first and second substrates disposed in spaced, parallel relationship and sealed to confine an ionizable gas therebetween, first and second sets of plural electrode pairs supported on said first and second substrates, respectively, and disposed in orthogonal relationship to establish four points of intersection between each electrode pair of said first set and each electrode pair of said second set defining respectively corresponding discharge points, a discharge at a given first one of said four intersection points defined by a first electrode in a given pair in each of said sets as a write-in discharge point requiring that a voltage of a predetermined first level in excess of a normal firing voltage be applied to the first electrodes of said first and second sets intersecting at that given write-in point, a discharge at a given write-in point reduces the firing voltage at a corresponding display discharge point defined by the second electrodes of said given pairs to a level less than the normal firing voltage level, a discharge at said corresponding display discharge point requiring that a voltage of a level less than said normal firing voltage and greater than said reduced firing voltage level be applied to the second electrodes of said first and second sets wherein each of said first and second sets of electrodes is arranged in plural groups, each group including plural pairs of electrodes, a first plurality of means respectively corresponding to said plural electrode pairs in each of said group for commonly connecting the first electrode of the corresponding electrode pair in each of said groups, a second plurality of means respectively corresponding to said plural groups for commonly connecting the second electrodes of the pairs of electrodes in the corresponding group, first and second driving means for selectively applying predetermined voltages to said first and second plurality of connecting means, respectively, for each of said sets, said first driving means including addressing means for each of said first and second sets for selectively applying a write voltage having said predetermined first level to a selected one of said first plurality of connecting means for each said set, said write voltage establishing write-in discharges at the intersecting points formed by the first electrodes of the pairs of electrodes of said groups corresponding to the selected one of said first plurality of connecting means of each said set, and said second driving means including addressing means for each of said first and second sets for selectively applying a reduced firing voltage to a selected one of said second plurality of connecting means for each said set, the reduced firing voltage establishing a display discharge at that intersecting point of said second electrodes adjacent a correspondingly addressed write-in discharge point, and said second driving means subsequently applying sustain voltages to said plurality of second connecting means to produce a sustaining display discharge at the intersecting points which correspond to a previously addressed write-in point and have been discharged by the application of a reduced firing voltage 5. An addressable gas discharge panel and driving system therefor, comprising:

first and second substrates disposed in spaced, parallel relationship and sealed to confine an ionizable gas therebetween, first and second sets of plural electrode pairs supported on said first and second substrates, respectively, and disposed in orthogonal relationship to establish four points of intersection between each electrode pair of said first set and each electrode pair of said second set defining respectively corresponding discharge points, a discharge at a given first one of said four intersection points defined by a first electrode in a given pair in each of said sets as a write-in discharge point requiring that a voltage of a predetermined first level in excess of a normal firing voltage be applied to the first electrode of said first and second sets intersecting at that given write-in point, a discharge at a given write-in point reduces the firing voltage at a corresponding display discharge point defined by the second electrodes of the corresponding pairs to a level less than the normal firing voltage level, a discharge at said corresponding display discharge point requiring that a voltage of a level less than said normal firing voltage and greater than said reduced firing voltage level to be applied to the second electrodes of said first and second sets wherein each of said first and second sets of electrodes is arranged in plural groups, each group including plural pairs of electrodes, a first plurality of means respectively corresponding to said plural electrode pairs in each of said groups for commonly connecting the first electrode of the corresponding electrode pair in each of said groups, a second plurality of means respectively corresponding to said plural groups for commonly connecting the second electrodes of the pairs of electrodes in the corresponding group first and second driving means for selectively applying predetermined voltages to said first and second plurality of connecting means, respectively, for each of said sets, said first driving means including addressing means for each of said first and second sets for selectively applying a write voltage having said predetermined first level to a selected one of said first plurality of connecting means for each said set, said write voltage establishing write-in discharges at the intersecting points formed by the first electrodes of the pairs of electrodes of said groups corresponding to the selected one of said first plurality of connecting means of each said set, said second driving means including addressing means for each of said first and second sets for selectively applying a reduced firing voltage to a selected one of said second plurality of connecting means for each said set, the reduced firing voltage establishing a display discharge at that intersecting point of said second electrodes adjacent a correspondingly addressed write-in discharge point, and said second driving means subsequently applying sustain voltages to said plurality of second connecting means to produce a sustaining display discharge at the intersecting points which correspond to a previously addressed write-in point and have been discharged by the application of a reduced firing voltage, a plurality of shift electrodes for each of said first and second sets of electrodes, each said shift electrode being disposed between successive ones of said pairs of electrodes of each said set, and a shift driver means for said shift electrodes of each of said first and second sets for selectively supplying successive shift voltages to said shift electrodes of a given said set, thereby to shift discharges established at intersecting points of said display to successive intersecting points in the direction of the successive shift electrodes of said given set.

6. A method of driving a gas discharge panel having first and second substrates disposed in spaced, parallel relationship and sealed to confine an ionizable gas therebetween, first and second sets of plural electrode pairs supported on said first and second substrates, respectively, and disposed in orthogonal relationship to establish four points of intersection between each electrode pair of said first set and each electrode pair of said second set defining respectively corresponding discharge points with addresses determind by the electrodes associated with the said points of intersection, a discharge at a given first one of said four intersection points defined by a first electrode in a given pair in each of said sets as a write-in point requiring that a voltage of a predetermined first level in excess of a firing voltage be applied to the first electrodes of said first and second sets intersecting at that given write-in point, the discharge at a given second one of said four intersection points defined by a second electrode in a given pair in each of said sets as a display point requiring that a voltage of a level less than said firing voltage be applied to the second electrodes of said first and second sets intersecting at that given display point when a discharge is produced at its corresponding given write-in point, the discharge panel further includes at least one shift electrode disposed between successive pairs of electrodes of at least one of said first and second sets, said method comprising the steps of:

identifying a pair of electrodes of each of said first and second sets corresponding to the address of points of intersection at which a discharge is to be established;

applying a write voltage having a value greater than said firing voltage to a first electrode of the identified pair of each of said first and second sets corresponding to the addressed write-in point to establish a discharge at the write-in point of the said first electrodes of said identified pairs of said first and second sets, selectively applying an energizing voltage having a value less than said firing voltage to second electrodes of said identified pairs of said first and second sets thereby to establish a discharge at the display point of said second electrodes of said identified pairs of said first and second sets in accordance with the discharge established at the write-in point of said first electrodes of the respectively corresponding, identified pairs of said first and second sets, and applying successive shift voltages to successive ones of said shift electrodes thereby to shift discharges established at addressed intersecting points to successive intersecting points of said electrodes of said first and second sets in the direction of the successive shift electrodes.

* * * * *

UNITED STATES PATENT OFFICE
CERTIFICATE OF CORRECTION

Patent No. 4,044,349 Dated August 23, 1977

Inventor(s) Shizuo Andoh and Norihiko Nakayama

It is certified that error appears in the above-identified patent and that said Letters Patent are hereby corrected as shown below:

Column 2, line 55, "defind" should be -- defined --;
Column 4, line 27, "or" should be deleted;
Column 5, line 48, "discharge" should be -- discharging --;
Column 5, line 62, after "the" insert -- X --;
Column 6, line 42, "i,e." should be -- i.e. --;
Column 6, line 57, "i.n" should be -- i·n --;
Column 7, line 17, "i.n" should be -- i·n --;
Column 7, line 17, "xj.m" should be -- xj·m --;
Column 7, line 19, "n+n" should be -- i+n --;
Column 7, line 20, "electron" should be -- electrode --;
Column 7, line 36, "1/2.Vw" should be 1/2·Vw --;
Column 7, line 59, "he" should be -- the --;
Column 8, line 66, after "XBI" insert -- and YBI --.

Signed and Sealed this

*Twentieth* Day of *December 1977*

[SEAL]

*Attest:*

RUTH C. MASON
*Attesting Officer*

LUTRELLE F. PARKER
*Acting Commissioner of Patents and Trademarks*